United States Patent
Zu et al.

(10) Patent No.: US 12,289,196 B2
(45) Date of Patent: Apr. 29, 2025

(54) SMART ONLINE LINK REPAIR AND JOB SCHEDULING IN MACHINE LEARNING SUPERCOMPUTERS

(71) Applicant: Google LLC, Mountain View, CA (US)

(72) Inventors: Yazhou Zu, Sunnyvale, CA (US); Alireza Ghaffarkhah, San Jose, CA (US); Dayou Du, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/077,884

(22) Filed: Dec. 8, 2022

(65) Prior Publication Data

US 2024/0195679 A1 Jun. 13, 2024

(51) Int. Cl.
| | |
|---|---|
| *G06F 15/177* | (2006.01) |
| *H04L 41/0659* | (2022.01) |
| *H04L 41/16* | (2022.01) |
| *H04L 43/02* | (2022.01) |
| *H04L 43/0823* | (2022.01) |

(52) U.S. Cl.
CPC ......... *H04L 41/0661* (2023.05); *H04L 41/16* (2013.01); *H04L 43/02* (2013.01); *H04L 43/0823* (2013.01)

(58) Field of Classification Search
CPC ..... H04L 41/0661; H04L 41/16; H04L 43/02; H04L 43/0823
USPC .................................................. 709/220–221
See application file for complete search history.

(56) References Cited

U.S. PATENT DOCUMENTS

| | | | |
|---|---|---|---|
| 9,699,075 B2 * | 7/2017 | Thubert | H04L 41/0668 |
| 10,075,327 B2 | 9/2018 | Maltz et al. | |
| 10,158,523 B2 | 12/2018 | Kashyap et al. | |
| 10,592,330 B2 | 3/2020 | Gowin et al. | |

(Continued)

FOREIGN PATENT DOCUMENTS

| | | |
|---|---|---|
| CN | 112436984 A | 3/2021 |
| EP | 3439241 A1 | 2/2019 |
| WO | 2018202205 A1 | 11/2018 |

OTHER PUBLICATIONS

International Search Report and Written Opinion for International Application No. PCT/US2023/020821 dated Aug. 17, 2023. 15 pages.

(Continued)

*Primary Examiner* — Bharat Barot
(74) *Attorney, Agent, or Firm* — Lerner David LLP

(57) ABSTRACT

Generally disclosed herein is an approach for smart topology-aware link disabling and user job rescheduling strategies for online network repair of broken links in high performance networks used in supercomputers that are common in Machine Learning (ML) and High-Performance Computing (HPC) applications. While a disabled link is repaired online, user jobs may continue to run. The broken links may be detected as part of pre-flight checks before the user jobs run and/or during the job run time via a distributed failure detection and mitigation software stack which includes a centralized network controller and multiple agents running on each node. The network controller may ensure that the user jobs are rerouted to healthy links within the same network until the broken links are fixed and tested by the repair workflows, in which case the broken links are enabled again by the network controller for future user jobs.

20 Claims, 4 Drawing Sheets

(56) References Cited

U.S. PATENT DOCUMENTS

| | | | |
|---|---|---|---|
| 10,924,368 B1 | 2/2021 | Kaddoura | |
| 11,438,211 B1* | 9/2022 | Lyubomirsky | H04L 41/0654 |
| 11,750,458 B1* | 9/2023 | DiLeo | H04L 41/0843 |
| | | | 709/221 |
| 2009/0172154 A1* | 7/2009 | Aviles Sanchez | G06F 16/9566 |
| | | | 709/224 |
| 2019/0197077 A1* | 6/2019 | Li | H04L 41/16 |
| 2020/0192964 A1* | 6/2020 | Li | H04L 41/16 |
| 2021/0409262 A1* | 12/2021 | Watson | H04L 41/0661 |

OTHER PUBLICATIONS

CATT. New Solution for KI#4/5: Sub-QoS Flow based QoS Architecture and Policy Control. 3GPP Draft; S2-2202715, vol. SA WG2, No. e-meeting; Mar. 29, 2022, 9 pages. Retrieved from the Internet: <https://ftp.3gpp.org/tsg_sa/WG2_Arch/TSGS2 150E_Electronic_2022-04/Docs/S2-2202715.zip S2-2202715 XRrvQoS Architecture.docx>.

"What is Telemetry?" [online]. [Retrieved Dec. 6, 2022] [Retrieved from the internet: <https://info.support.huawei.com/info-finder/encyclopedia/en/Telemetry.html>, 8 pages, Dec. 7, 2021.

* cited by examiner

SMART ONLINE LINK REPAIR AND JOB SCHEDULING IN MACHINE LEARNING SUPERCOMPUTERS

BACKGROUND

Supercomputer networks may often fail. When the supercomputer networks fail in part, it may be useful to continue using the remaining functioning part of the network. Although some fault-tolerant routing algorithms may be utilized to find healthy links, the broken links may still need to be fixed without impacting running user jobs or blocking pending user jobs.

BRIEF SUMMARY

The present disclosure provides for maximizing the utilization of a network by ensuring that healthy links can be used to run user jobs while broken links are fixed. Generally disclosed herein is an approach for smart topology-aware link disabling and user job rescheduling strategies for online network repair of broken links in high-performance networks used in supercomputers that are common in Machine Learning (ML) and High-Performance Computing (HPC) applications. User jobs may continue to run while a disabled link is repaired online. The broken links are detected as part of pre-flight checks before the user jobs run and/or during the job run time via a distributed failure detection and mitigation software stack which includes a centralized network controller and multiple agents running on each node. Upon detection of broken links, the disabling command may be received from the network controller and enforced by each node's agent. User jobs may be rescheduled when links are disabled by the network controller to ensure broken links are removed from the user jobs. The network controller may ensure that the user jobs are rescheduled to utilize the healthy links within the same network until the broken links are fixed and tested by repair workflows, in which case the broken links are enabled again by the network controller for future user jobs. The network controller may push relevant topology information to the node agents for the purpose of pre-flight checking and topology-aware failure detection. The node agents may send relevant failure information to the network controller.

An aspect of the disclosure provides for a method for repairing broken links without interrupting user jobs running on a high-performance network in an ML or HPC supercomputer. The method includes receiving, by a network controller, information relating to new user jobs coming into the supercomputer. The method also includes performing, by the network controller and a plurality of node agents, a pre-flight check prior to running the user jobs, wherein the pre-flight check includes gathering network state information from a plurality of nodes within the network. The method further includes determining, by the network controller and the plurality of node agents, whether a network error exists in the network based on the network state information. The method also includes monitoring, by the network controller and the plurality of node agents, whether one or more links associated with the network error are in use. The method further includes disconnecting, by the network controller and the plurality of node agents, the one or more links associated with the network error from the rest of the network. The method also includes repairing the disconnected links using a repair workflow which is initiated by the network controller.

In yet another example, the method further includes updating the network controller with information on the repaired links during a synchronous poll.

In yet another example, the method further includes evicting user jobs running on the links associated with the network error.

In yet another example, the method further includes scheduling the evicted user jobs within the network with the disconnected broken links and rerouting the evicted user jobs to healthy links after the faulty network component is sent for repair.

Another aspect of the disclosure provides for a high-performance network system in an ML or HPC supercomputer including a network controller, a network intent database, a plurality of compute nodes, and a plurality of switch nodes, wherein the network controller is configured to receive information relating to new user jobs coming into the supercomputer. The network controller is also configured to perform a pre-flight check before running the user jobs, wherein the pre-flight check includes gathering entire network state information from a plurality of nodes within the network. The network controller is further configured to determine whether the network states of each node match a network intent stored in a database to find a network error in the network. The network controller is also configured to monitor whether one or more links associated with the network error are in use. The network controller is further configured to disconnect the one or more links associated with the network error from the rest of the network. The network controller is also configured to repair the disconnected links using a repair workflow initiated by the network controller.

In another example, the network controller is further configured to update with information on the repaired links during a synchronous poll.

In yet another example, the network controller is further configured to evict user jobs running on the links associated with the network error.

In yet another example, the network controller is further configured to reroute the user jobs to only utilize healthy links within the network.

The above and other aspects of the disclosure can include one or more of the following features. In some examples, aspects of the disclosure provide for all of the following features, in combination.

In an example, the network controller operates in an asynchronous event-driven manner to enforce a high-speed interconnect network state. In another example, the pre-flight check includes assessing the expected bi-directional neighbor of a link among the plurality of nodes, a bit-error rate of a link channel, and a healthy level of a switch.

In yet another example, one or more links associated with the network error are monitored using an agent-observed network telemetry.

In yet another example, the loopback test is performed on ports of the disconnected links to establish the disconnected links' bi-directional health level.

In yet another example, disconnection of the one or more links takes place at a data layer while a physical layer is active with a potentially erroneous state slowing repair and post-repair quality assurance.

In yet another example, each of the plurality of nodes includes a demon or the plurality of node agent running thereon for network management.

DETAILED DESCRIPTION

Figure 1:
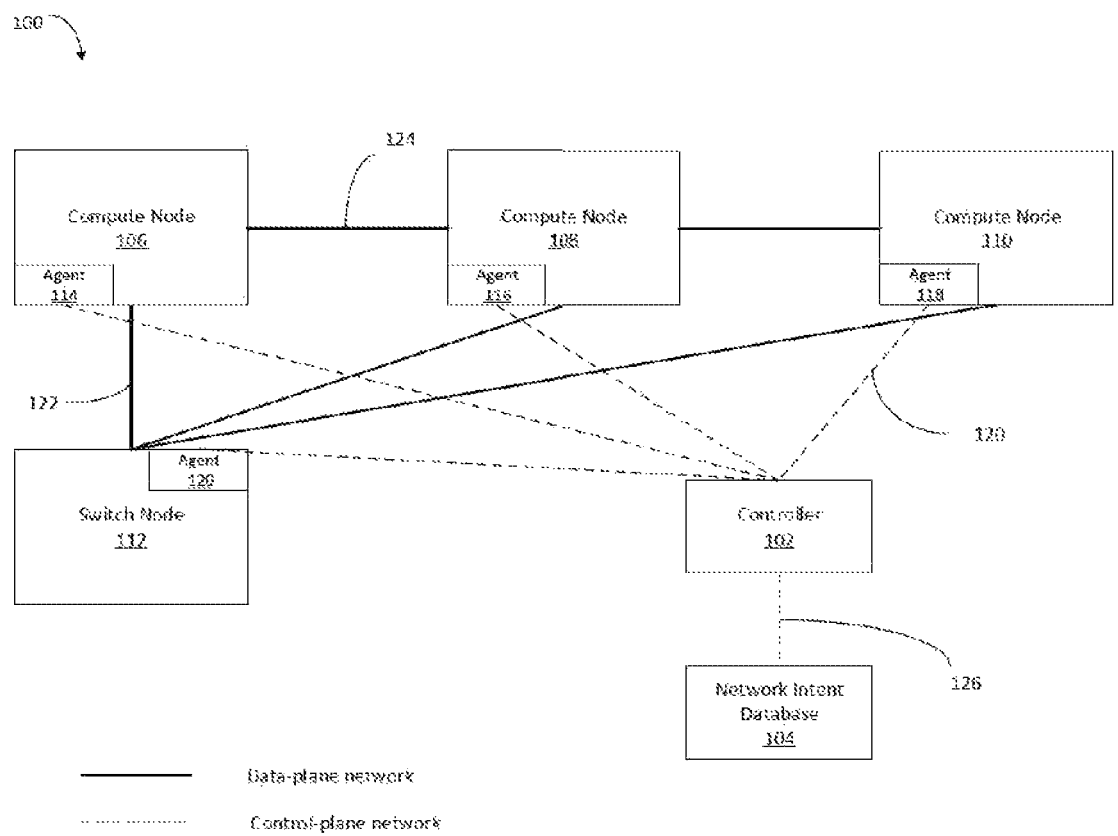
FIG. 1 depicts a block diagram of an example network comprising compute nodes and switch nodes according to aspects of the disclosure.

The technology generally relates to a smart topology-aware link disabling and user job rescheduling strategy for online network repair of broken links in high-performance networks used in supercomputers. In particular, the technology allows for continued usage of a healthy network to be carried out while the failed network is being repaired without impacting the healthy network. Using "online repair", a user job may continue running while some link is being repaired. Online repair may also include serving the data without interrupting user jobs running on a high-speed interconnect network.

Compute nodes may include CPUs, customized accelerator ASICs, or a mixture of both. Compute nodes may communicate with each other directly or indirectly over switches in a data-plane network. Agent software may run on each compute or switch node to gather information related to a node-local link which is then sent to a centralized network controller. The agents may also execute the controller's commands. The agent and the controller may communicate via a separate control-plane network.

Network intent information may be stored in a database. Network intent information may be a modeled graph depicting what a network should look like when a set of compute nodes is deployed, and the centralized network controller may save it in a separate database. The network between compute nodes may all be software-defined and software-managed. A daemon or an agent may continuously act for network management on each compute node or switch node. The agents on all nodes may connect to a centralized software management service. The centralized software management service may compute and control high-speed network control actions. The controller may gather information about all network states from the agents and information about the network intent from the database. Based on the information, the controller may determine an optimal network state mutation for each given user job the network receives.

According to some examples, an incoming user job may select a set of compute nodes, and the controller may determine an optimal network setting for the set of nodes based on the connection information of links and the state of the global network. The controller may operate in an asynchronous and event-driven manner for computing and enforcing the high-speed interconnect network state. The controller performs a pre-flight check for every incoming user job, and the controller gathers all network information from the compute nodes and the switch nodes and compares the information with the network intent. The pre-flight checks may assess an expected bi-directional neighbor of a link, a bit-error rate of a link channel, and the condition of a switch. If any error is determined from the pre-flight checks, the controller may modify the previously configured routing and/or flow control by disconnecting the affected links and rerouting packets originally flowing through the disconnected links to other links within the same network. The network errors may also be stored in the controller to be reported to a human repair team.

The controller and the agents may also operate synchronously. The controller may periodically check the status of the agents-observed network telemetries to check whether the compute nodes and the associated link is being used or not. In one example, the agents may continuously monitor network telemetry and update the controller with the latest status of each compute node and switch node. The controller may continuously compare the status of the compute nodes and the switch nodes with the network intent and determine which links or ports need to be disabled.

According to some examples, broken links determined during a pre-flight check may be disabled for usage through a driver and firmware on a compute node or through the driver or port-controlling firmware running on the switch nodes.

According to some examples, a link-disabling action may be implemented on a data layer. A physical layer may still be active with a potentially erroneous state in order to enable repair and post-repair quality assurance. At the data layer level and above, the disabled link may be visible to the controller, such that the controller may prevent any packets from attempting to arrive or leave on the broken links. The controller may send the link-disabling instruction to the agents and the agents may then instruct the compute node on which they run to disable the erroneous links. The reported erroneous interconnect links, switches, or nodes may be repaired by first disconnecting the links, switches, or nodes from the rest of the network. For those links connected to the erroneous switch nodes or compute nodes, a loopback test may be performed on the port where the links are disconnected.

According to other examples, upon recovery of the broken link, the agents running on the compute nodes may pick up the updated network states automatically during its synchronous poll from the controller. The controller may also receive the update about the recovered links and reschedule the previously evicted and rescheduled user jobs factoring the recovered links into account. Once the user jobs are rescheduled, all the links may be in working condition and pre-flight tests may not disable any links.

FIG. 1 depicts a block diagram of an example network comprising compute nodes and switch nodes. Network 100 may comprise compute node 106, compute node 108, compute node 110, switch node 112, controller 102, and network intent database 104. The compute nodes may be CPUs, or customized accelerator ASICs, or a mixture of both. A compute node may also include any type of device that may provide storage, networking, memory, and processing resources needed for virtual machine instances in a cloud environment.

An agent software may run on each compute node and switch node. For example, agent 114 may run on compute node 106, agent 116 may run on compute node 108, agent 118 may run on compute node 110, and agent 120 may run on switch node 112 (collectively referred to as agents 114-118). Agent software may gather node-to-node link information which may be sent to a centralized network controller service, such as controller 102. The agent software may include daemon running on a compute node and can run on the same compute node as an application or on a separate out-of-band management processor. When running on the compute node, the agent software may monitor the links of the network for the compute node or the bag-on-the-side network between accelerators. The accelerator may connect to the compute node over PCIe. If the agent software runs on the same compute node as the application, the agent software may communicate with the accelerator and its associated links over the same in-band PCIe. If the agent software runs on an out-of-band management processor, the agent software may communicate with the accelerator and its associated links via other out-of-band channels.

Controller 102 may contain a processor, memory and other components typically present in computing devices. The memory can store information accessible by the processors including instructions that can be executed by the processor. Memory can include data that can be retrieved, manipulated, or stored by the processor. The memory may be a type of non-transitory computer-readable medium capable of storing information accessible by the processor, such as a hard-drive, solid state drive, tape drive, optical storage, and memory card.

Compute node 106, compute node 108 and compute node 110 may communicate with each other directly or indirectly over switch node 112. Switch node 112 may include any type of device that connects physical network links. Switch node 112 may take traffic in on a networking port or a network interface or select an output port to send the traffic. Compute node 106, compute node 108, and compute node 110 may communicate with each other directly via a data-plane network using a link, such as a network link 124 (illustrated by a bold line). Compute node 106, compute node 108 and compute node 110 may also indirectly communicate with each other over switch node 112 using the data-plane network such as network link 122. A date-plane network may include network functions and processes that move packets from a source node to a destination node. Control-plane networks may include network functions and processes that determine how packets should be forwarded. Control-plane networks may heavily focus on reliability and focus less on performance or speed rate of communications between nodes. High-speed interconnect may include any type of interconnect that has high-throughput, high line rate and low latency using data-plane networks and network links such as network link 122.

Controller 102 may receive network intent information from network intent database 104 via a control-plane network using a link such as a network link 126 and receive information about the network states from agents 114-120 via a control-plane network using a link such as network link 120. Controller 102 may determine whether any changes are needed for an optimal network state for the current user jobs running on compute nodes 106-110. Network intent database 104 is a database that may store network intent information. Network intent information may be a modeled graph depicting what a network should look like when a set of compute nodes is deployed. In a modeled graph, devices and various abstraction levels may be represented as nodes, and links between nodes may show how the devices or abstraction levels connect to each other.

Figure 2:
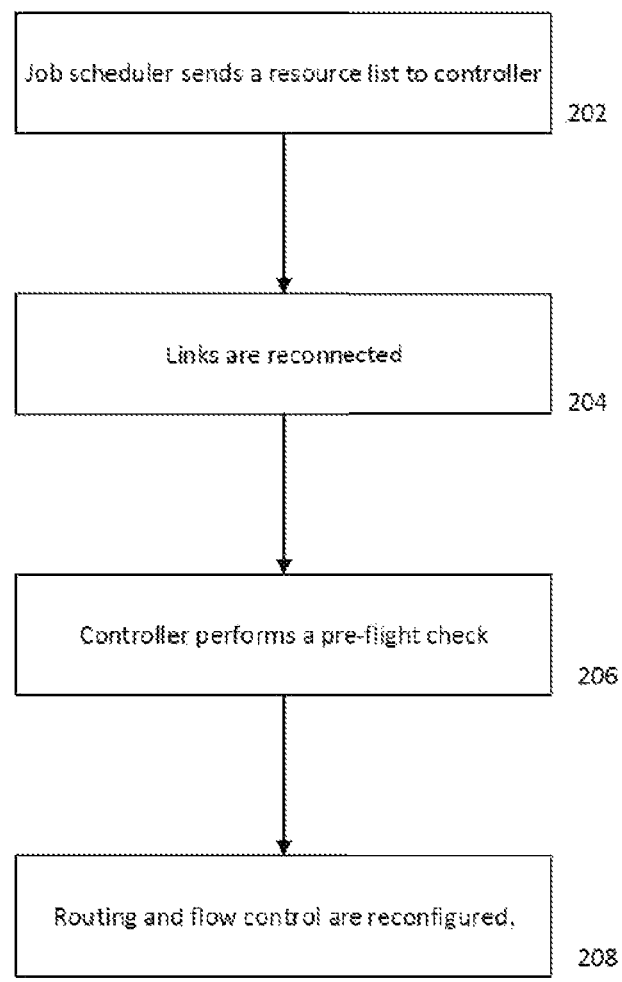
FIG. 2 depicts a flow diagram of an example method for online network repair according to aspects of the disclosure.

FIG. 2 depicts a flow diagram of an example method for online network repair. According to block 202, a user job scheduler may send a resource list to a controller, such as controller 102. A user job scheduler finds resources for a job and assigns the resource to the user job by loading job binaries on the compute nodes, which naturally utilizes the network resources interconnecting the compute nodes, including any links or switches 106-110. A resource list may include information related to any incoming user jobs and a set of compute nodes available for the incoming user jobs.

According to block 204, circuits between two compute nodes may be reconnected by controller 102. Network controller 102 may compute the optimal network setting for the selected set of compute nodes based on the resource list and the current global network state. For example, controller 102 may reconnect network link 124 between compute node 106 and compute node 108 when compute node 106 appears to have trouble communicating with or sending packets to other compute nodes through switch node 112 via network link 122 or directly communicating with compute node 108 via network link 124. Controller 102 may reconnect compute node 106 with other compute nodes such as compute node 110. In some other examples, considering the nature of the incoming user jobs and the health state of a set of compute nodes, controller 102 may select a different set of compute nodes to process the incoming user jobs if there are other compute nodes than compute node 102, compute node 104 and compute node 106.

According to block 206, controller 102 may perform a pre-flight check for every incoming user job. During a pre-flight check, controller 102 may gather all network information from compute nodes and switch nodes. Controller 102 may receive network intent from network intent database 104 and compare the gathered network information with the network intent. Controller 102 may determine whether the network state with respect to each compute node and switch node matches the network intent. Controller 102 may perform specific tests to assess the expected bi-directional neighbor of a link, the bit-error rate of a link, and the health level of switch nodes to determine the health state of each compute node and switch node.

According to block 208, controller 102 may communicate with agents 114-120 to disable a link having an error and re-route or control the flow of packets based on the comparison of the gathered network information with the network intent. Controller 102 may continuously receive the state of each compute node from agents 114-120's checking network telemetry and may combine this information with the network information gathered during a pre-flight check to determine which link has a problem and needs to be disabled. Once the links are disabled, the user jobs may be transferred to a new set of compute nodes when controller 102 reroutes and changes the flow of the packets. Controller 102 may communicate the above changes in routing and flow control with agents 114-120.

Figure 3:
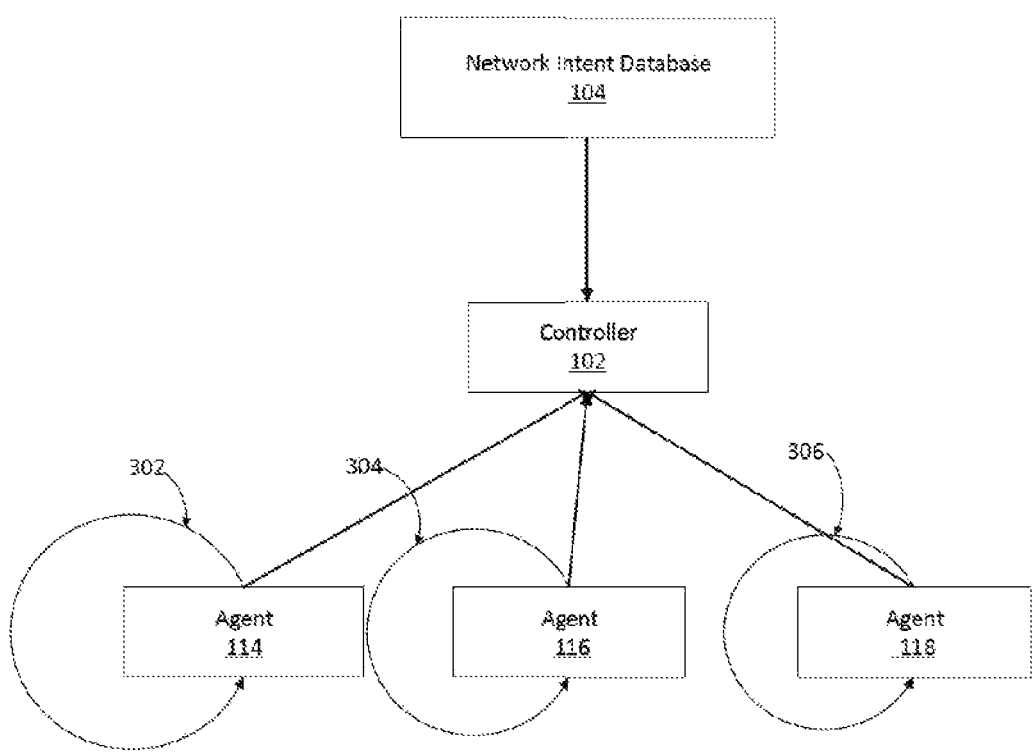
FIG. 3 depicts a block diagram of an example agents monitoring network telemetry according to aspects of the disclosure

FIG. 3 depicts a block diagram of an example agent monitoring network telemetry. Agent 114 may continuously check network telemetry 302, agent 116 may check network telemetry 304, and agent 118 may check network telemetry 306. Network telemetry may include any type of technology that may allow for the collection of measurements or statistical data pertaining to links between compute nodes or links between compute nodes and switch nodes. Agents 114-118 may periodically poll the network telemetry to check whether particular compute nodes and the associated links are being used or not. Controller 102 may evict the user jobs associated with the compute node or the links for rescheduling if any problem is found in one of the links that agents 114-118 monitor. Based on agents 114-118's information, controller 102 may compare the information with network intent information received from network intent database 104. Controller 102 may determine which links or ports should be disabled or should be part of the next user jobs.

Figure 4:
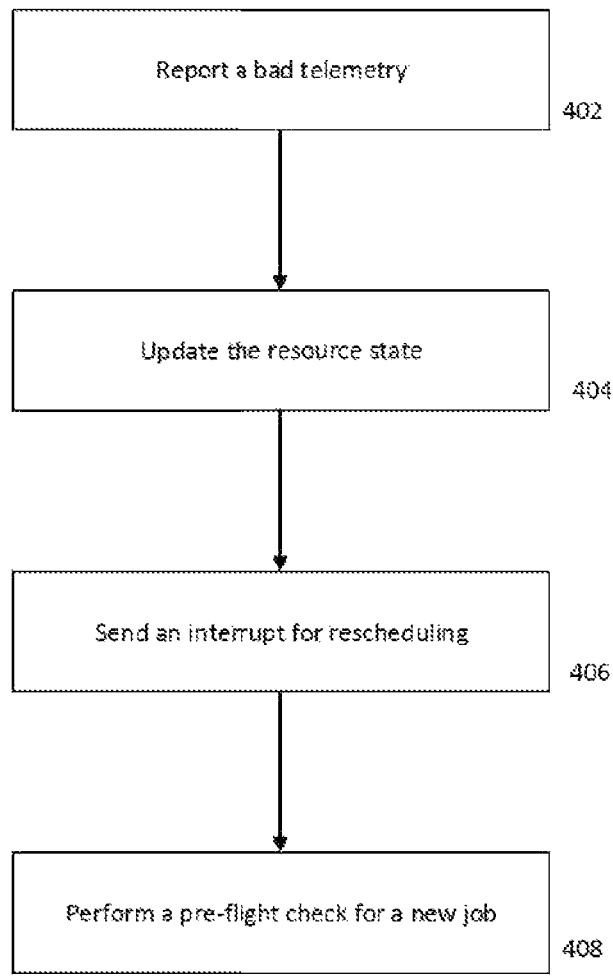
FIG. 4 depicts a flow diagram of an example method for rescheduling a running job in response to a broken link according to aspects of the disclosure.

FIG. 4 depicts a flow diagram of an example method for rescheduling a running user job when a link is broken. According to block 402, agents 114-118 may report bad telemetry to controller 102 when there is an error in any links between compute nodes or links between compute nodes and switch nodes. As described above, such an error may be monitored based on the assessment of the expected bi-directional neighbor of a link, or the bit-error rate of a link.

According to block 404, controller 102 may update the resource state of the entire network when it receives bad telemetry reports from agents 114-118. Controller 102 may update the state of compute nodes with broken links based on the received bad telemetry reports. Controller 102 may receive the telemetry reports from agents 114-118 automatically during the periodic synchronous poll. Controller 102 may check the updated resource state against the network intent from network intent database 104 to determine which user jobs need to be rescheduled.

According to block 406, controller 102 may send an interrupt to the user job scheduler for rescheduling. For example, the interrupt may include requests for eviction or cancellation of the user jobs previously assigned to a compute node currently encountering a broken link or having an issue with its sub-components. The interrupt may also include information related to candidate compute nodes that are capable of receiving and processing the canceled/evicted user jobs, which information may be determined by controller 102 based on the updated resource state received from agents 114-118.

According to block 408, the user job scheduler may send the updated user job orders to controller 102. Controller 102 may perform a pre-flight check again and communicate with agents 114-118 to make certain that the state of each compute node is consistent with the new network intent. The network intent may be updated when the user job scheduler updates the user job orders. Once controller 102 confirms the new state of the compute nodes, controller 102 may reconfigure the flow of packets considering the rescheduled user jobs.

After the broken link is recovered, agents 114-118 may update controller 102 about the state of the compute nodes, and controller 102 may send an updated interrupt to the user job scheduler to reconfigure the network state to include the recovered broken link and the compute nodes associated with the broken link.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for repairing broken links without interrupting user jobs running on a high-performance network in a Machine Learning (ML) or High-Performance Computing (HPC) supercomputer, the method comprising:
   receiving, by a network controller, information relating to new user jobs coming into the supercomputer;
   performing, by the network controller and a plurality of node agents, a pre-flight check prior to running the user jobs, wherein the pre-flight check includes gathering network state information from a plurality of nodes within the network;
   determining, by the network controller and the plurality of node agents, whether a network error exists in the network based on the network state information;
   monitoring, by the network controller and the plurality of node agents, whether one or more links associated with the network error are in use, each of the one or more links defining how two or more of the nodes within the network connect to each other;
   disconnecting, by the network controller and the plurality of node agents, the one or more links associated with the network error from the rest of the network; and
   repairing the disconnected links using a repair workflow initiated by the network controller.

2. The method of claim 1, wherein the network controller operates in an asynchronous event-driven manner to enforce a high-speed interconnect network state.

3. The method of claim 1, wherein the pre-flight check includes assessing an expected bi-directional neighbor of a link among the plurality of nodes, a bit-error rate of a link channel, and a healthy level of a switch.

4. The method of claim 1, further comprising updating the network controller with information on the repaired links during a synchronous poll.

5. The method of claim 1, wherein the one or more links associated with the network error are monitored using an agent-observed network telemetry.

6. The method of claim 1, wherein a loopback test is performed on ports of the disconnected links to establish the disconnected links' bi-directional health level.

7. The method of claim 1, further comprising evicting user jobs running on the links associated with the network error.

8. The method of claim 7, further comprising:
   scheduling the evicted user jobs within the network with the disconnected broken links; and
   rerouting a traffic packet associated with the evicted user jobs only using healthy links around the broken links within the network.

9. The method of claim 1, wherein disconnecting the one or more links takes place at a data layer while a physical layer is active with a potential erroneous state slowing repair and post-repair quality assurance.

10. The method of claim 1, wherein each of the plurality of nodes includes a demon or the plurality of node agents running thereon for network management.

11. A high-performance network system in a Machine Learning (ML) or High Performance Computing (HPC) supercomputer comprising:
    a network controller;
    a network intent database;
    a plurality of compute nodes; and
    a plurality of switch nodes;
    wherein the network controller is configured to:
    receive information relating to new user jobs coming into the supercomputer;

perform a pre-flight check prior to running the user jobs, wherein the pre-flight check includes gathering entire network state information from a plurality of nodes within the network;

determine whether the network states of each node match a network intent stored in a database to find a network error in the network;

monitor whether one or more links associated with the network error are in use, each of the one or more links defining how two or more of the nodes within the network connect to each other;

disconnect the one or more links associated with the network error from the rest of the network; and repair the disconnected links using a repair workflow initiated by the network controller.

12. The system of claim 11, wherein the network controller operates in an asynchronous event-driven manner to enforce a high-speed interconnect network state.

13. The system of claim 11, wherein the pre-flight check includes assessing an expected bi-directional neighbor of a link among the plurality of nodes, a bit-error rate of a link channel, and a healthy level of a switch.

14. The system of claim 11, wherein the network controller is further configured to update with information on the repaired links during a synchronous poll.

15. The system of claim 11, wherein the one or more links associated with the network error are monitored using an agent-observed network telemetry.

16. The system of claim 11, wherein a loopback test is performed on ports of the disconnected links to establish the disconnected links' bi-directional health level.

17. The system of claim 11, wherein the network controller is further configured to evict user jobs running on the links associated with the network error.

18. The system of claim 17, wherein the network controller is further configured to reroute the user jobs to only utilize healthy links within the network.

19. The system of claim 11, wherein disconnecting the one or more links takes place at a data layer while a physical layer is active with a potential erroneous state slowing repair and post-repair quality assurance.

20. The system of claim 11, wherein each of the plurality of nodes includes a demon or agent software running thereon for network management.

* * * * *